United States Patent
Besler et al.

(10) Patent No.: US 9,578,970 B2
(45) Date of Patent: Feb. 28, 2017

(54) PIVOTING ARTICULATION JOINT AND PIECE OF FURNITURE PROVIDED WITH SUCH

(71) Applicants: Boris Besler, Guetersloh (DE); Lars-Philipp Kiskemper, Steinhagen (DE)

(72) Inventors: Boris Besler, Guetersloh (DE); Lars-Philipp Kiskemper, Steinhagen (DE)

(73) Assignee: KINTEC-SOLUTION GMBH, Rietberg (DE)

( * ) Notice: Subject to any disclaimer, the term of this patent is extended or adjusted under 35 U.S.C. 154(b) by 124 days.

(21) Appl. No.: 14/595,462

(22) Filed: Jan. 13, 2015

(65) Prior Publication Data
US 2015/0196125 A1    Jul. 16, 2015

(30) Foreign Application Priority Data
Jan. 14, 2014  (DE) .................. 10 2014 200 550

(51) Int. Cl.
*A47C 7/54* (2006.01)
*A47C 1/027* (2006.01)
(Continued)

(52) U.S. Cl.
CPC ............... *A47C 7/54* (2013.01); *A47C 1/027* (2013.01); *A47C 17/12* (2013.01); *F16C 11/10* (2013.01); *Y10T 403/32262* (2015.01)

(58) Field of Classification Search
CPC .......... A47C 7/54; A47C 17/12; A47C 1/027; A47C 7/543; F16C 11/10; Y10T 403/32262
(Continued)

(56) References Cited

U.S. PATENT DOCUMENTS

| 444,719 A | * | 1/1891 | Zapp | ............... A47C 17/12 297/116 |
| 3,340,564 A | * | 9/1967 | Lebreton | ............... A47C 1/027 16/341 |

FOREIGN PATENT DOCUMENTS

| DE | 198 01 358 C1 | 7/1999 |
| DE | 201 12 976 U1 | 11/2001 |

(Continued)

OTHER PUBLICATIONS

Office Action of German Patent Office issued in Application No. 10 2014 200 550.7 dated Dec. 11, 2014 (5 pages).
(Continued)

*Primary Examiner* — Milton Nelson, Jr.
(74) *Attorney, Agent, or Firm* — Flynn, Thiel, Boutell & Tanis, P.C.

(57) ABSTRACT

A lockable pivoting articulation joint includes a first joint section, a second joint section, a pivot bearing allowing the first and second joint sections to be rotatable in relation to each other about a main axis, and a locking mechanism on the first joint section switchable between a release condition and a locking condition. The second joint section is lockable in relation to the first joint section in at least one relative rotational position.
On the second joint section a retaining surface is provided. The locking mechanism has a clamping lever attached to the first joint section to be pivotable about a clamping lever axis between a locking position and a release position. The clamping lever has a clamping surface for locking abutment on the retaining surface and the clamping surface is inclined in relation to a tangential plane.

19 Claims, 5 Drawing Sheets

(51) Int. Cl.
*A47C 17/12* (2006.01)
*F16C 11/10* (2006.01)

(58) Field of Classification Search
USPC .................................................. 297/115, 116
See application file for complete search history.

(56) References Cited

FOREIGN PATENT DOCUMENTS

| | | |
|---|---|---|
| DE | 20 2007 006 758 U1 | 8/2007 |
| DE | 20 2009 006 444 U1 | 8/2009 |

OTHER PUBLICATIONS

Form PCT/ISA/206 Invitation to Pay Additional Fees with Partial International Search Report issued in International Application No. PCT/EP2014/074668 and English translation of categories of documents cited dated Jan. 28, 2015 (6 pages).

\* cited by examiner

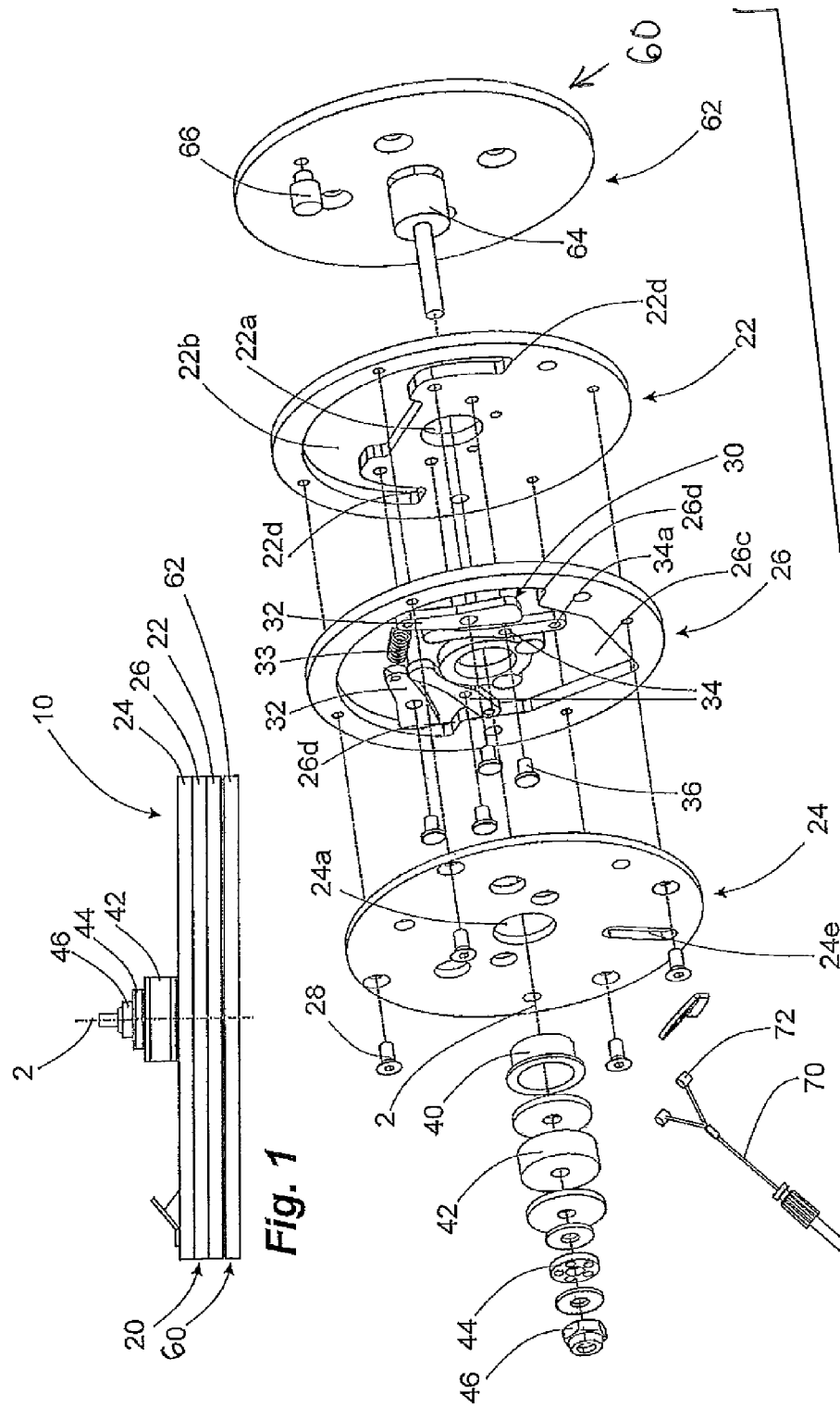

PIVOTING ARTICULATION JOINT AND PIECE OF FURNITURE PROVIDED WITH SUCH

CROSS-REFERENCE TO RELATED APPLICATIONS

This claims priority from German Application No. 10 2014 200 550.7, filed on Jan. 14, 2014, the disclosure of which is hereby incorporated by reference in its entirety into this application.

FIELD OF APPLICATION AND PRIOR ART

The invention relates to a lockable pivoting articulation joint, in particular for a piece of furniture, having a first joint section and a second joint section, having a swivel or pivot bearing by means of which the first joint section and the second joint section are rotatable in relation to each other about a main axis, and having a locking mechanism on the first joint section which is switchable between a release condition and a locking condition, and thereby the second joint section is lockable in relation to the first joint section in at least one relative rotational position.

Such a pivoting articulation joint is disclosed, for example, in DE 198 01 358 C1. The joint described therein is provided with a pivot bearing including a locking bolt attached to a rotatable support frame, which bolt is capable of engaging into a locking hole in two different positions in the axial direction, in order to produce the locked condition. Axial movement of the locking bolt is caused via a deflecting lever arm and an actuation rod with actuation element acting thereon.

The embodiment described in DE 198 01 358 C1 is greatly designed for its particular purpose of application and does not permit a simple adoption to other types of pieces of furniture. The individual adaptation of a generic pivoting articulation joint to different purposes of application is comparatively expensive.

Problem and Solution

The invention provides a pivoting articulation joint which offers a broad range of applicability at low cost and with high stability. According to a first aspect of the invention, this aim is achieved according to the invention in that the first joint section has an upper and a lower housing plate, and further in that the locking mechanism includes at least one pivotable clamping lever arranged between the housing plates and supported by an axle member which is fixed to the upper and/or to the lower housing plate.

The two joint sections of a pivoting articulation joint according to the invention are those sections that according to defined utilization are connected to two sections, in particular of a piece of furniture, which are to be connected pivotably relative to each other and are rotatable in relation to each other about a main axis. For this purpose the sections are preferably provided with fixing holes or the like.

The first joint section is the one that includes the switchable locking mechanism for fixing the second joint section in one or more defined relative positions. Said locking mechanism has at least one clamping lever which is movable, in order to inhibit relative mobility of the second housing section in a locking position.

A particularly compact and stable construction is achieved in that the first joint section has two housing plates at once defining the outer shape of the first joint section. The main extension plane of these housing plates is oriented orthogonal to the main axis. Also, the axis of the at least one pivotable clamping lever is arranged orthogonal to the housing plates. Thus, the housing plates can also provide a stabilizing guidance for the clamping lever, in addition to their function of accommodating and shielding the locking mechanism. By means of an axle member, for example, in the type of an axle rivet, the clamping lever has a bearing on one of the two housing plates.

The two housing plates preferably have a plate thickness between 3 mm and 10 mm. The area defined by the outer contour thereof is preferably at least 60 cm$^2$, in particular preferred at least 100 cm$^2$. However, within said area, there may be provided different breakthroughs, which will be detailed hereinafter. The outer contours of the two housing plates are preferably identical. In particular, a circular outer contour is considered to be advantageous. The comparatively large area of the housing plates allows the introduction of bending moments into the pivoting articulation joint far remote from the main axis and, thus, achieves high stability. Also achieved thereby is a large support surface of the housing plate on the furniture segment where the first and/or the second housing section are/is fixed.

In addition, an intermediate plate can be provided which rests on the surface of both housing plates and has a breakthrough, wherein the locking mechanism and in particular the pivotable clamping lever is disposed. The intermediate plate preferably has a thickness between 3 mm and 10 mm, similar to the housing plates.

The first housing section of a pivoting articulation joint according to the invention is, thus, preferably designed in a type of sandwich structure, ideally composed of three superimposed plates which due to their surface contact constitute a very stable unit. The plates are interconnected preferably by a rivet connection. The composite composed of the plates can have a very flat structure and preferably has a total thickness, relating to the plates, of less than 20 mm. This permits a multitude of designated uses even with limited available space.

The plates are preferably produced by blanking, in particular with reference to the outer contour. Indeed, even rivet holes and centered recesses for passing a pivot axis of the second joint section and/or a recess in one of the housing plates, through which a retaining projection of the second joint section extends, are produced in the respective housing plate preferably by blanking.

Said retaining projection which is preferably provided on the second joint section and extends up to the region of the locking mechanism of the first joint section is intended to be pressed against an abutment surface on the first joint section, preferably in the locked condition. Said abutment surface can be provided on one of the housing plates or on said intermediate plate. A particular advantage is provided if the abutment surface is composed of the intermediate plate together with the upper housing plate of the first joint section facing the second joint section.

According to a second aspect of the invention, a generic pivoting articulation joint, which preferably is equally designed with said two housing plates, is furthermore configured such that the locking mechanism includes the following components: firstly, the locking mechanism has a clamping lever which is pivotable between the locking position and the release position. Furthermore, the locking mechanism has a spring element by means of which force is applied to the clamping lever in the direction towards its locking position. For the purpose of moving the clamping element, the pivoting articulation joint according to this aspect has a shifting cable device by means of which the clamping lever is pivotable counter to the force of the spring element into the release position.

In an embodiment including said two housing plates, the cable device extends up to an intermediate zone between said housing plates, where the shifting cable is coupled to the clamping lever in such a manner that, via tension on the cable, the clamping lever can be displaced counter the force of the spring element in the direction towards its release position. A particular advantage is obtained if a breakthrough is provided in one of the housing plates and through the breakthrough the cable is passed into the intermediate zone between the housing plates. The use of a shifting cable device, which is coupled immediately to the locking mechanism located within the housing, provides for a pivoting articulation joint of very versatile utility. Thus, the shifting cable passing preferably outside the pivoting articulation joint in a tubular guidance can be led to an actuation handle for locking and releasing the pivoting articulation joint, and the handle is kind of freely positionable on the piece of furniture provided with the pivoting articulation joint.

A particularly simple configuration is obtained with the cable engaging directly on the pivotable clamping lever, since then a minimum of components will suffice. However, it has been found to be particularly advantageous to provide a similarly pivotable transmission lever, whereon the shifting cable device engages directly and for its part has a contact zone by means of which momentum can be applied to the clamping lever. Thereby, an advantageous force deflection can be put into effect, as the case may be.

According to a third aspect of the invention, a generic pivoting articulation joint which, preferably in the above described manner, is provided with a first joint section having a lower and an upper housing plate and/or shifting cable device, is configured as follows. The articulation join has a retaining surface on the second joint section arranged eccentrically in relation to the main axis of the pivoting articulation joint. For cooperation with said retaining surface the locking mechanism has at least one clamping lever which is attached on the first joint section and pivotable about a clamping lever axis between a locking position and a release position. Therein, the clamping lever is equipped with a clamping surface which is provided for locking abutment on the retaining surface of the second joint section, said clamping surface being inclined in relation to a tangential plane to the clamping lever axis.

The specific feature of this configuration is the inclination of the clamping surface. Said surface is inclined in such a manner that it has a non-uniform distance to the clamping lever axis. The retaining surface which preferably is provided on a retaining pin or on another type of retaining projection which in the locked condition of the pivoting articulation joint rests on an abutment surface of the first joint section, does not need to be arranged in a very precise manner on the second joint section, due to the inclined clamping surface. The inclined clamping surface results in the fact that the clamping lever during pivoting towards the locking position increasingly approaches the desired position of the retaining surface in the locked condition and, finally, in the locked condition reaches abutment thereon. Should the retaining surface of the second joint section, due to imprecise manufacturing, be somewhat offset in relation to its desired position relative to the second joint section, secure locking can be obtained anyway, owing to said variable spacing of the clamping surface to the clamping lever axis. The reduced need for precision lowers production costs.

The inclination of the clamping surface in relation to the tangential plane is preferably less than 25°. This is to ensure that there is self-locking, regardless of the inclined clamping surface, where said self-locking, in the locking position of the clamping lever, prevents the retaining surface of the second joint section from leaving its locked position.

In general, there is an option to design the inclined clamping surface in a planar manner. However, in particular for release from the locked condition without difficulty, it is advantageous if the clamping surface has a convex curvature.

A pivoting articulation joint according to the invention preferably includes a pivot bearing which has an axle section on the second joint section extending in particular preferably through breakthroughs in the upper and lower housing plates of the first joint section.

The axle section can be led directly through the breakthroughs in the upper and lower housing plates, respectively, of the first joint section. However, it is advantageous if a radial bearing bush is inserted in the first joint section which extends in particular preferably through breakthroughs in the upper and the lower housing plates and for its part receives said axle section of the second joint section. Instead of such a slide bearing, in general, use of a radial rolling body bearing is possible. In said embodiment using two spaced housing plates, these plates are well adapted to absorb bending moments in the vicinity of the radial bearing.

As mentioned above, it is considered to be particularly advantageous if lockability is achieved in that a retaining projection having a retaining surface is present, which projection is fixed to the second joint section and extends in particular preferably through a breakthrough in one of the housing plates of the second joint section into that latter section. A structurally very simple configuration is obtained if the second joint section has a base plate which preferably has outer contours concordant to the housing plates of the first joint section and whereon said axle section and/or the retaining projection are/is fixed. These can be connected to the base plate in particular by a welded joint, a caulked joint, or a crimped connection. If the pivoting articulation joint is designed to include a clamping lever with inclined clamping surface by the above mentioned ways and means, then the exact positioning of the axle section and of the retaining projection on the second joint section is of subordinated importance, so that very efficient production of said second joint section is feasible.

Furthermore, a particular advantage is in that a pivoting articulation joint according to the invention is configured for locking the joint sections in at least two different relative rotational positions and, for that purpose, includes two clamping levers, each of the levers being attached to the first joint section to be pivotable about a respective distinct clamping lever axis between a locking position and a release position.

An advantage is therein if the clamping levers for transfer into the respective locking position are pivoted in opposite directions. Furthermore, it is an advantage if a common shifting cable device is provided by means of which both clamping levers are pivotable into the release position counter the force of a spring element. For cost reduction it is furthermore advantageous if a common spring element is provided, where the spring ends thereof are attached eccentrically on both the clamping levers, so that force is applied to each of the clamping levers in the direction towards its locking position by means of a common spring element.

Furthermore, the invention also relates to a piece of furniture having a pivoting articulation joint of the type as described. What is considered in this context is in particular a piece of seating furniture with a pivotable arm rest, wherein the pivoting articulation joint is mounted between a base and said arm rest, in order to achieve the desired pivotability of the arm rest. An intended purpose of application of a pivoting articulation joint according to the invention is the use for a pivotable arm rest which is pivotable about a main axis inclined in relation to the vertical direction at an angle between 30° and 70°, in order to allow selective use as an arm rest or an enlargement of the seating or reclining area.

BRIEF DESCRIPTION OF THE DRAWINGS

Further aspects and advantages of the invention will become apparent from the claims and the exemplary embodiment explained hereinbelow with reference to the figures. In the figures:

FIG. 1 shows a pivoting articulation joint according to the invention in a side view;

FIG. 2 shows the pivoting articulation joint of FIG. 1 in an exploded view;

DETAILED DESCRIPTION OF THE EXEMPLARY EMBODIMENT

Figure 3A:
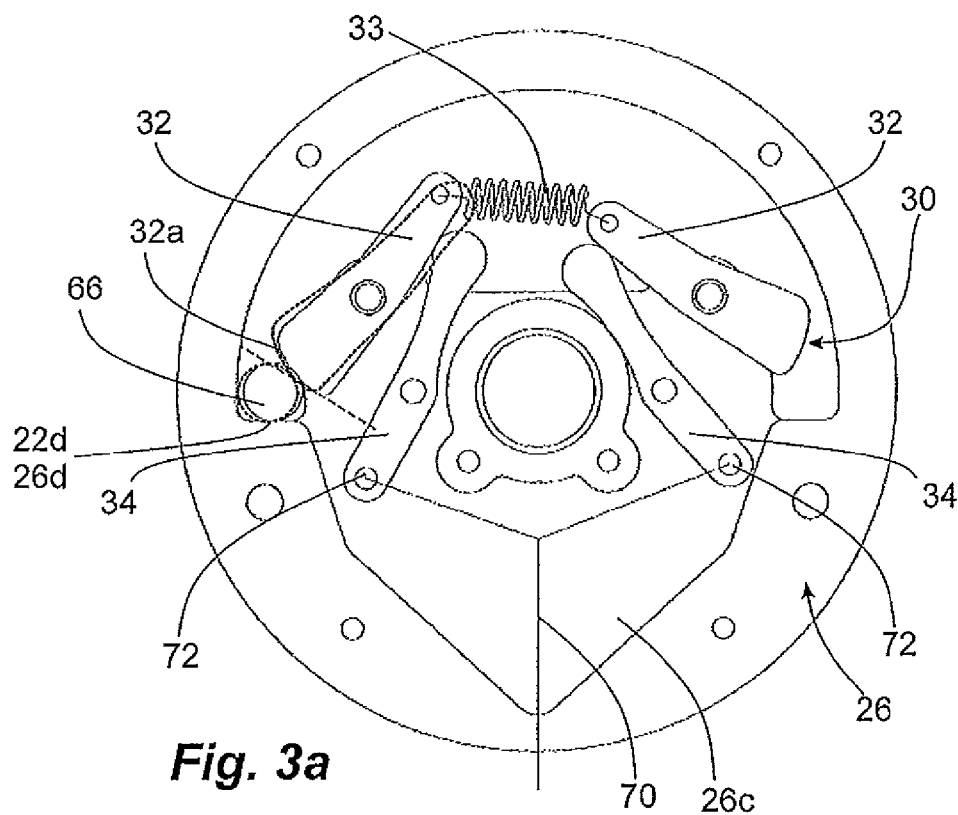
FIGS. 3a to 3d show a pivoting procedure starting from a first locked condition and ending in a second locked condition.

FIG. 1 shows a pivoting articulation joint 10 according to the invention which includes two main components, a first joint section 20 and a second joint section 60. The two joint sections 20, 60 are pivotable in relation to each other about a main axis 2 to a limited extent. In the present case, pivotability is about 180°.

The structure in detail can be seen in the exploded illustration of FIG. 2. Apparent therefrom is that the first joint section 20 has two housing plates 22, 24 closing the joint section on both sides, and between said plates an intermediate plate 26 is disposed. In addition to different smaller breakthroughs for receiving of rivets and for passing a cable device 70 that will be explained in more detail below, the plates 22, 24, 26 have, in particular, the following breakthroughs as discussed below.

The two housing plates 22, 24 have a centered breakthrough 22a, 24a through which an axle section 64 of the second joint section 60 passes. In addition, the housing plate 22 has an arcuate breakthrough 22b extending over an angle of approximately 180° for receiving a retaining projection 66 of the second joint section in a manner as will be explained in more detail below. The intermediate plate 26 has a large-area breakthrough 26c defining an installation space which is congruent in sections with the breakthrough 22b of the housing plate 22, however, the breakthrough 26c is more enlarged as compared thereto. Said breakthrough 26c of the installation space is for accommodation of a locking mechanism 30, as will be explained in more detail below.

As apparent from FIG. 1, the two housing plates 22, 24 and the intermediate plate 26 are flush aligned in the mounted condition. They are securely connected to one another by rivets 28. Thereby, an extraordinarily stable and compact construction is obtained. Since the plates each have a thickness between 5 and 8 mm, the stack of plates forming the first joint section is not more than about 1.5 cm to 2 cm high and, thus, is versatile in use. The area enclosed by the outer contour of the plates is in each case about 100 cm², so that very stable support and securing of said first joint section on a piece of furniture is possible. The joint sections 20, 60 are each provided with fixing breakthroughs for fixing to those components that are intended to be pivotable in relation to each other during defined utilization.

Said breakthroughs in the housing plates are produced by blanking. This procedure permits very cost-efficient manufacture with sufficient precision.

As mentioned above, the breakthrough 26c in the intermediate plate 26 constitutes the installation or accommodation space for the locking mechanism 30. Said mechanism comprises two clamping levers 32 and two transmission levers 34, each being a precision blanked part and fixed to the housing plate 22 to be pivotable by means of rivets 36. The two upper ends of the clamping levers 32, relating to the perspective of FIG. 2, are connected to each other via a tension spring 33 which applies force in the clockwise direction to the left hand side one of the clamping levers 32 and applies force in the counter-clockwise direction to the right hand side one of the clamping levers 32. The transmission levers 34 rest on the clamping levers with their upper ends, with reference to FIG. 2. The respective lower end is in each case provided with a seat 34a for connector elements 72 of a 2-end Bowden cable 70. The clamping levers 32 each have clamping surfaces 32a which will be explained in more detail hereinafter. These clamping surfaces are provided for cooperation with the retaining projection 66 of the second joint section 60.

For producing the locked condition, furthermore, in each case two abutment surfaces 22d, 26d are provided on each of the breakthroughs 22b, 26c, and are likewise provided for cooperation with the retaining projection 66.

For accommodation of the axle section 64 of the second joint section 60, a slide bearing sleeve 40 is provided on the housing plates 22, 24, in addition to the above described breakthroughs 22a, 24a, and inserted into said breakthroughs, wherein the slide bearing sleeve is supported on the housing plates 22, 24. Furthermore, for fixing a tapered end section of the axle section 64 an elastomer element 42, an axial rolling bearing 44, a securing nut 46 and a few washers are provided.

For the purpose of releasing the locked condition of the pivoting articulation joint, the above mentioned Bowden cable 70 is provided. Said cable is led through the housing plate 24 in the vicinity of a breakthrough 24e.

The function and further aspects of the pivoting articulation joint will become apparent from the illustrations according to FIGS. 3a to 3d. These Figures show the principle of operation of the locking mechanism 30 with the housing plate 24 removed.

FIG. 3a shows a first locked condition. The retaining projection 66 of the second joint section 60 extends through the breakthroughs 22b, 26c and rests on the abutment surfaces 22d, 26d formed thereby. By means of the left hand side clamping lever 32 and its clamping surface 32a the retaining projection 66 is fixed in its position.

The clamping surface 32a has a specific shape design, since the distance between said clamping surface 32a and the clamping lever pivoting axis decreases in the locking direction. The result thereof is that a precise attachment of the retaining projection 66 on the second joint section 60 is not important. This is illustrated by the alternative position of the components of the retaining projection 66 and the clamping lever 32 in dashed lines. Even in case that the retaining projection 66 is located farther outside than for intended use, the clamping surface 32a inclined in relation to a tangential direction to the clamping lever pivoting axis 32b is capable of producing the clamping condition reliably. The reduced need for precision during manufacturing of the clamping joint entailed therewith results in reduced production costs. The inclination of the clamping surface 32a is illustrated by a long-dashed tangential line to the pivot axis of the left hand side clamping lever 32.

A pivoting movement of the joint sections 20, 60 is not allowed in the locked condition according to FIG. 3a. Upon trying to turn the second joint section 60 in relation to the first joint section 20 in the clockwise direction, this movement is prevented by the clamping lever 32 and the self-locking action obtained due to the not more than small slope of the clamping surface 32a.

In order to release the pivoting articulation joint, force is applied to the cable device 70 in the direction of the arrow 7. Thereby, the two transmission levers 34 are pivoted relative to each other, whereby the left hand side transmission lever 34 is pivoted counter-clockwise. The result thereof is that, due to the tangent contact to the left hand side clamping lever 32, momentum is applied to the transmission lever counter-clockwise, so that it leaves the locked position according to FIG. 3a. In the condition according to FIG. 3b, a pivot movement of the joint sections 60, 20 relative to each other is now possible. This is illustrated in FIG. 3c. Upon completion of a pivot movement of about 180°, the retaining projection 66 comes to abutment with the left hand side clamping lever 32 in the position as illustrated in dotted lines in FIG. 3c and causes temporary clockwise deflection of the lever until it reaches the second locked position, as illustrated in FIG. 3d. There is self-acting latching of the joint due to the spring force of the spring 33.

Figure 3B:
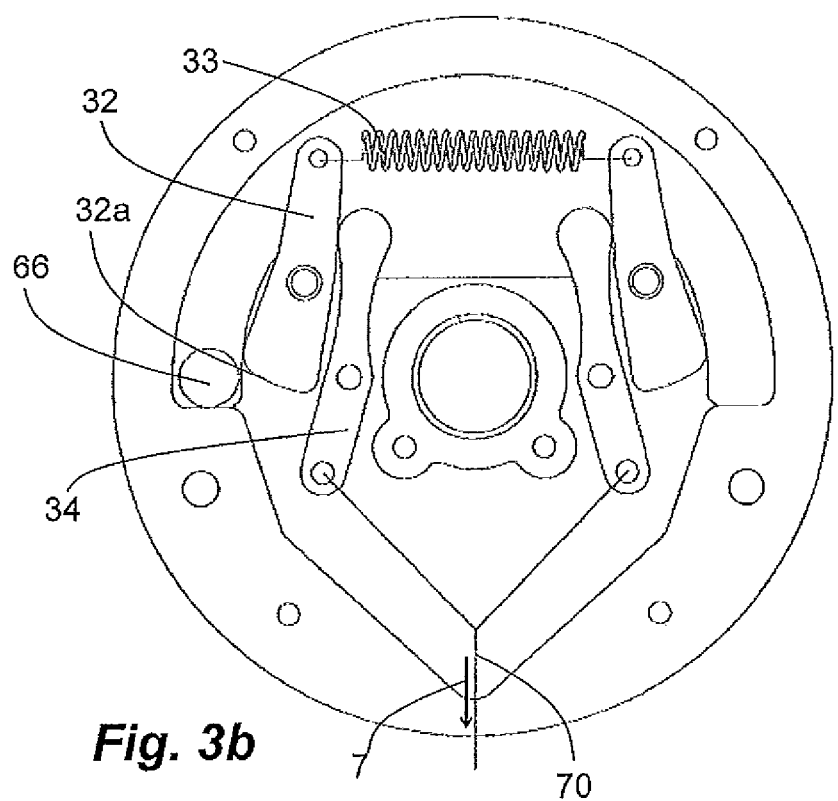
Figure 3C:
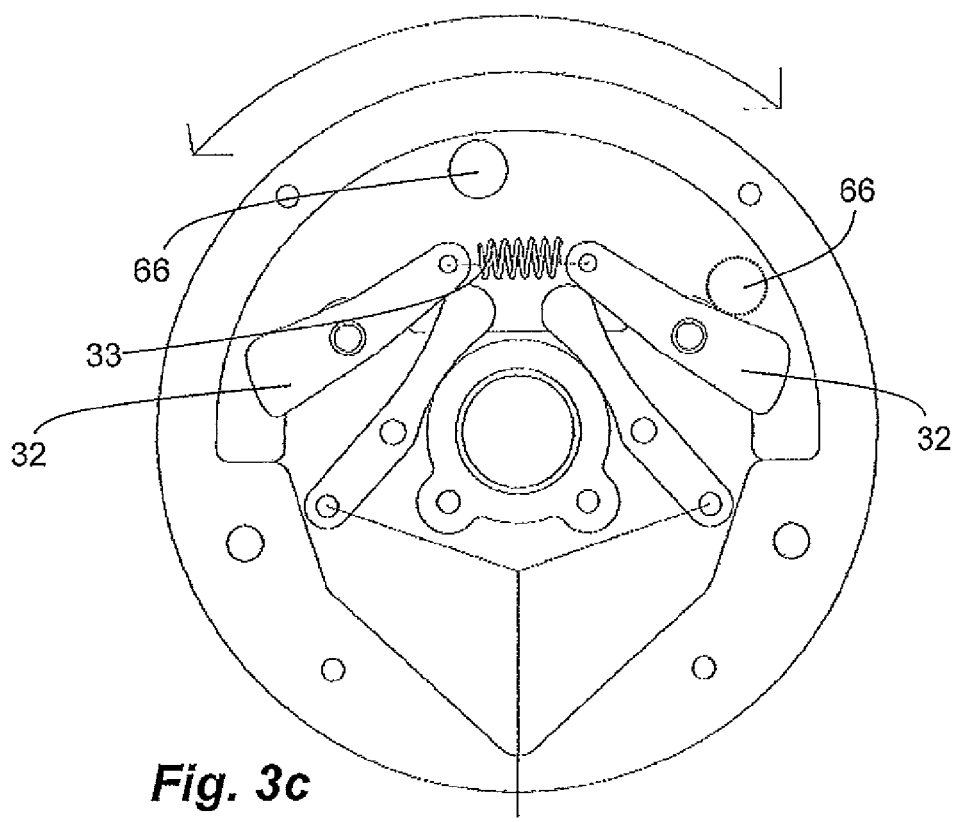
Figure 3D:
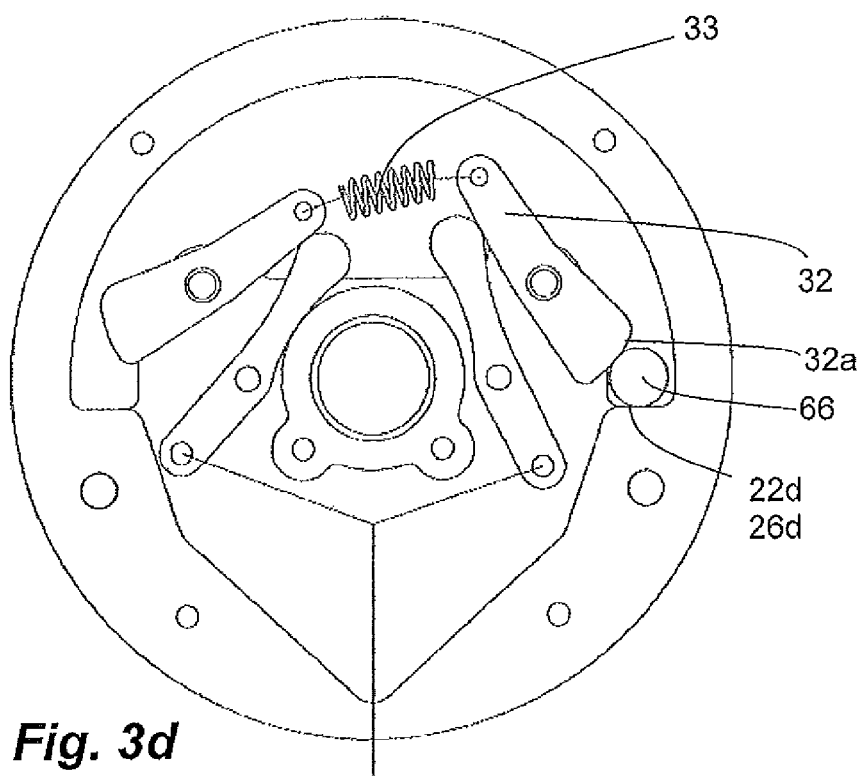

If starting therefrom the locked condition is to be released again, then the cable device 70 has to be manipulated in the same way as illustrated in FIG. 3b, which cable always pivots both clamping levers 32 in common towards their respective release position.

Figure 4A:
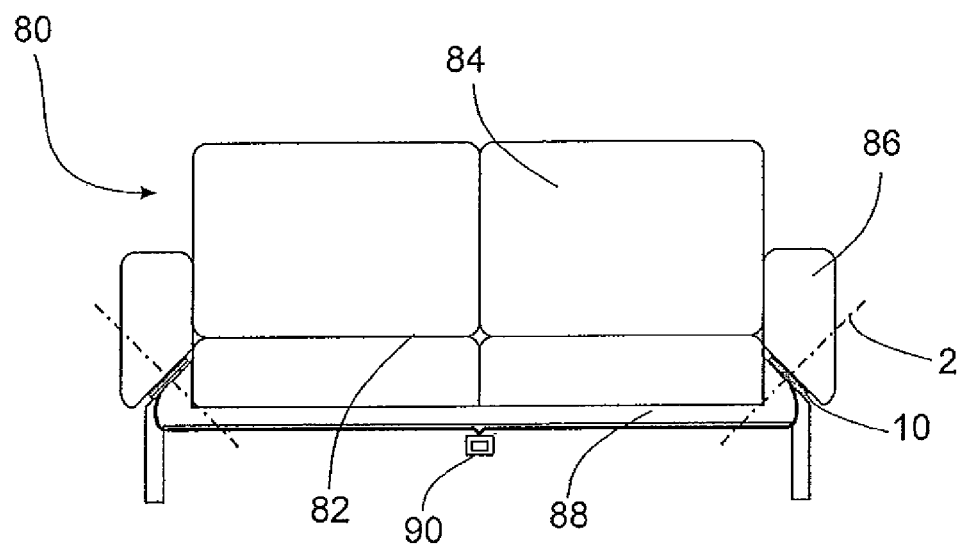
FIGS. 4a and 4b show a first piece of seating furniture according to the invention including a pivoting articulation joint according to FIGS. 1 to 3.
Figure 4B:
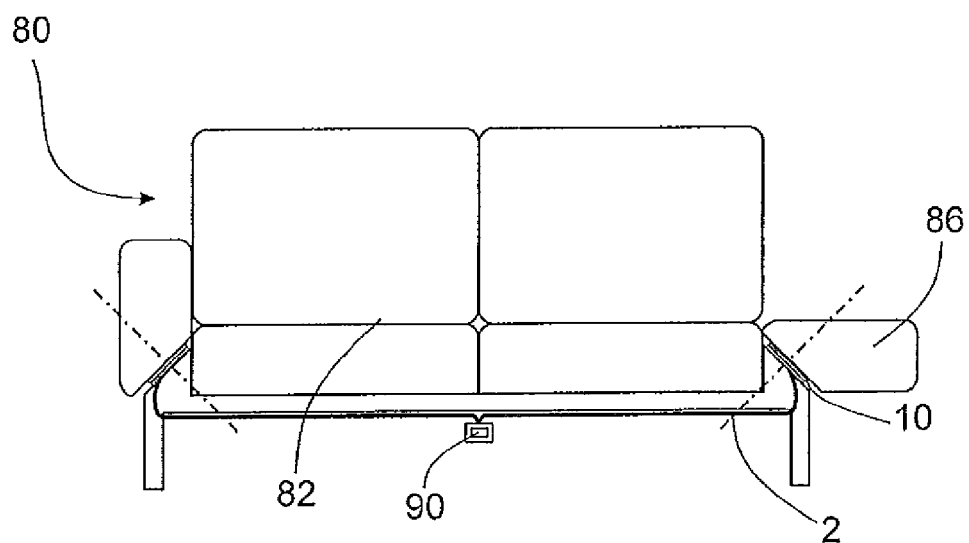

FIGS. 4a and 4b show an exemplary application for the articulation joint. Diagrammatically illustrated is a piece of seating furniture 80 which has a seating surface 82 and a back rest 84. In addition, two arm rests 86 are provided and pivotably articulated on a base 88 of the piece of seating furniture by means of the pivoting articulation joints 10 as described. The main axis 2 of the pivoting articulation joints 10 is oriented in a 45° angle to the vertical.

This allows pivoting of the arm rests 86 by 180°, in a manner as apparent from FIG. 4b, so that the arm rest then provides an enlargement of the seating surface or the reclining surface.

By using the cable device for operation, a handle for releasing the lockable pivoting articulation joints 10 can be arranged at a variety of locations, for example, the middle position as illustrated in FIG. 4a.

Figure 5A:
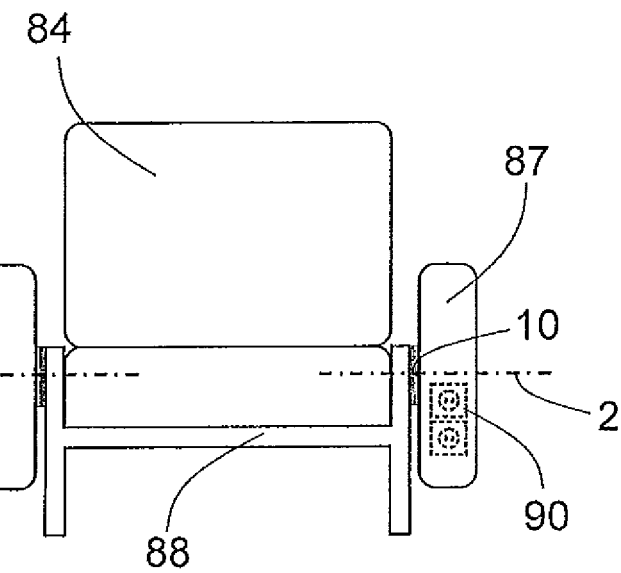
FIGS. 5a and 5b show a second piece of seating furniture according to the invention including a pivoting articulation joint according to FIGS. 1 to 3.
Figure 5B:
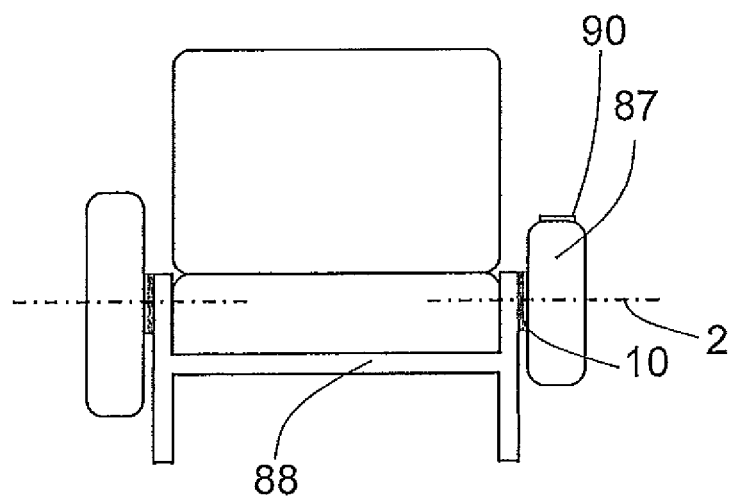

FIGS. 5a and 5b show another piece of furniture. Therein, the pivoting articulation joints 10 as described are also employed, wherein the main axis 2 here is oriented horizontally. The joints each allow pivoting of one arm rest 87.

In the exemplary embodiment according to FIGS. 5a and 5b this is used, for example, to pivot plug sockets 90 or other sockets for data cables from a backwards oriented storing position, according to FIG. 5a, into an upwards oriented use position, according to FIG. 5b. Also, an exchange of different types of arm rest materials or surface structures would be practicable in this manner.

The invention claimed is:

1. A lockable pivoting articulation joint comprising:
    a first joint section having an upper housing plate and a lower housing plate;
    a second joint section;
    a pivot bearing by which the first joint section and the second joint section are rotatable relative to each other about a main axis;
    a locking mechanism on the first joint section switchable between a release condition and a locking condition and by which locking mechanism the second joint section is lockable in relation to the first joint section in at least one relative rotational position, the locking mechanism having at least one pivotable clamping lever arranged between the upper housing plate and the lower housing plate and supported by an axle member fixed to the upper housing plate and/or to the lower housing plate; and
    a retaining projection on the second joint section and including a retaining surface for application of a clamping force, the retaining projection extending into the first joint section via a breakthrough in one of the upper housing plate and the lower housing plate.

2. A lockable pivoting articulation joint comprising:
    a first joint section, the first joint section having an upper housing plate, a lower housing plate and an intermediate plate resting flush on the upper housing plate and the lower housing plate, the intermediate plate having a breakthrough;
    a second joint section;
    a pivot bearing by which the first joint section and the second joint section are rotatable relative to each other about a main axis; and
    a locking mechanism on the first joint section switchable between a release condition and a locking condition and by which locking mechanism the second joint section is lockable in relation to the first joint section in at least one relative rotational position, the locking mechanism having at least one pivotable clamping lever arranged between the upper and lower housing plates and supported by an axle member fixed to the upper housing plate and/or to the lower housing plate, the locking mechanism being disposed in the breakthrough of the intermediate plate.

3. The pivoting articulation joint according to claim 2, wherein the upper housing plate and/or the lower housing plate and/or the intermediate plate are blanked parts.

4. The pivoting articulation joint according to claim 2, wherein at least one abutment surface is provided on the first joint section.

5. The pivoting articulation joint according to claim 2, wherein the pivot bearing has an axle section on the second joint section.

6. The pivoting articulation joint according to claim 5, wherein the second joint section has a base plate on which the axle section is fixed.

7. A piece of furniture with two furniture sections pivotable in relation to each other by the pivoting articulation joint according to claim 2.

8. The piece of furniture according to claim 7, wherein a first one of the two furniture sections is a furniture base and a second one of the two furniture sections is an arm rest pivotable in relation to the base.

9. A lockable pivoting articulation joint comprising:
a first joint section having an upper housing plate and a lower housing plate;
a second joint section;
a pivot bearing by which the first joint section and the second joint section are rotatable relative to each other about a main axis; and
a locking mechanism on the first joint section switchable between a release condition and a locking condition and by which locking mechanism the second joint section is lockable in relation to the first joint section in at least one relative rotational position, the locking mechanism having two pivotable clamping levers arranged between the upper housing plate and the lower housing plate, each pivotable clamping lever being supported by an axle member fixed to the upper housing plate and/or to the lower housing plate, the two clamping levers being configured for locking the pivoting articulation joint in at least two different relative rotational positions, each of the two clamping levers being attached to the first joint section so as to be pivotable about a respective distinct clamping lever axis between a locking position and a release position, wherein:
the two clamping levers for transfer into the respective locking positions are pivoted in opposite directions; and/or
a common shifting cable device is provided by which both of the two clamping levers are pivotable into the release position counter to a force of a spring element; and/or
a common spring element is provided, where spring ends thereof are attached eccentrically on both of the two clamping levers so that force is applied to each of the two clamping levers in the direction towards the locking position.

10. A lockable pivoting articulation joint comprising:
a first joint section having an upper housing plate and a lower housing plate;
a second joint section;
a pivot bearing by which the first joint section and the second joint section are rotatable relative to each other about a main axis; and
a locking mechanism on the first joint section switchable between a release condition and a locking condition and by which locking mechanism the second joint section is lockable in relation to the first joint section in at least one relative rotational position, the locking mechanism having at least one pivotable clamping lever arranged between the upper housing plate and the lower housing plate and supported by an axle member fixed to the upper housing plate and/or to the lower housing plate, wherein:
the lower housing plate, the upper housing plate and/or an intermediate plate of the first joint section have a thickness of less than 10 mm; and/or
the lower housing plate, the upper housing plate and/or an intermediate plate of the first joint section have a minimum diameter of at least 60 mm.

11. The pivoting articulation joint according to claim 10, wherein the lower housing plate, the upper housing plate and/or the intermediate plate have a thickness of less than 7 mm and a minimum diameter of at least 80 mm.

12. A lockable pivoting articulation joint comprising:
a first joint section;
a second joint section;
a pivot bearing by which the first joint section and the second joint section are rotatable relative to each other about a main axis; and
a locking mechanism on the first joint section switchable between a release condition and a locking condition and by which locking mechanism the second joint section is lockable in relation to the first joint section in at least one relative rotational position, the locking mechanism including:
a clamping lever pivotable between a locking position and a release position;
a spring element which applies force to the clamping lever towards the locking position; and
a shifting cable device by which the clamping lever is pivotable, counter the force of the spring element, into the release position.

13. The pivoting articulation joint according to claim 12, further including a pivotable transmission lever, the shifting cable device engaging the pivotable transmission lever, the pivotable transmission lever acting on the clamping lever at a contact zone.

14. A piece of furniture with two furniture sections pivotable in relation to each other by the pivoting articulation joint according to claim 12.

15. The piece of furniture according to claim 14, wherein a first one of the two furniture sections is a furniture base and a second one of the two furniture sections is an arm rest pivotable in relation to the base.

16. A lockable pivoting articulation joint comprising:
a first joint section;
a second joint section;
a pivot bearing by which the first joint section and the second joint section are rotatable relative to each other about a main axis; and
a locking mechanism on the first joint section switchable between a release condition and a locking condition and by which locking mechanism the second joint section is lockable in relation to the first joint section in at least one relative rotational position;
wherein a retaining surface is provided on the second joint section eccentrically in relation to the main axis;
wherein the locking mechanism has at least one clamping lever attached on the first joint section for pivoting movement about a clamping lever axis between a locking position and a release position; and
wherein the clamping lever has a clamping surface provided for locking abutment on the retaining surface of the second joint section, said clamping surface being inclined in relation to a tangential plane.

17. The pivoting articulation joint according to claim 16, wherein the clamping surface has a convex curvature.

18. A piece of furniture with two furniture sections pivotable in relation to each other by the pivoting articulation joint according to claim 16.

19. The piece of furniture according to claim 18, wherein a first one of the two furniture sections is a furniture base and a second one of the two furniture sections is an arm rest pivotable in relation to the base.

* * * * *